United States Patent [19]

Doty

[11] E Patent Number: Re. 33,528

[45] Reissued Date of Patent: Jan. 29, 1991

[54] MICROTUBE-STRIP HEAT EXCHANGER

[76] Inventor: F. David Doty, 701 Burmaster Dr., Columbia, S.C. 29223-4315

[21] Appl. No.: 371,663

[22] Filed: Jun. 23, 1989

Related U.S. Patent Documents

Reissue of:

[64] Patent No.: 4,676,305
Issued: Jun. 30, 1987
Appl. No.: 700,125
Filed: Feb. 11, 1985

U.S. Applications:

[63] Continuation of Ser. No. 243,048, Sep. 9, 1988, abandoned.

[51] Int. Cl.[5] ..... F28F 9/02

[52] U.S. Cl. ..... 165/158; 165/160; 165/173

[58] Field of Search ..... 29/157.4; 165/158, 159, 165/160, 172, 173, 177, 905, 910, 168, 185; 228/193

[56] References Cited

U.S. PATENT DOCUMENTS

| | | | |
|---|---|---|---|
| 2,298,996 | 10/1942 | Woods | 165/133 |
| 2,537,024 | 1/1951 | Bay | 165/178 |
| 2,657,018 | 10/1953 | Simpelaar | 165/163 |
| 2,722,048 | 11/1955 | Gier, Jr. | 29/157.3 |
| 2,804,284 | 8/1957 | Otten | 165/160 |
| 2,804,285 | 8/1957 | Peterson | 165/166 |
| 2,907,644 | 10/1959 | Cunningham et al. | 165/109 R |
| 2,948,517 | 1/1956 | Cosner | 165/172 |
| 3,044,687 | 7/1962 | Davey | 418/178 |
| 3,269,459 | 8/1966 | Popovitch | 165/140 |
| 3,349,465 | 10/1967 | La Pan et al. | 29/157.3 |
| 3,364,548 | 1/1968 | Marco | 29/157.3 |
| 3,452,814 | 7/1969 | Malewicz | 165/178 |
| 3,490,718 | 1/9170 | Vary | 165/47 |
| 3,526,274 | 9/1970 | Gardner | 165/145 |
| 3,532,159 | 10/1970 | Hammitt et al. | 165/104.22 |
| 3,782,457 | 1/1974 | Troy | 165/165 |
| 3,849,854 | 11/1974 | Mattioli et al. | 228/193 |
| 3,889,725 | 6/1975 | Rademacher et al. | 141/5 |
| 3,961,010 | 6/1976 | Holmes | 264/221 |
| 4,089,456 | 5/1978 | Toppen et al. | 228/195 |
| 4,098,852 | 7/1978 | Christen et al. | 165/173 |
| 4,117,884 | 10/1978 | Frei | 165/175 |
| 4,152,399 | 5/1979 | Germerdonk et al. | 165/81 |
| 4,223,723 | 9/1980 | Hilal | 165/133 |
| 4,253,516 | 3/1981 | Giardina | 165/78 |
| 4,289,196 | 9/1981 | Jabsen et al. | 165/157 |
| 4,386,505 | 6/1983 | Little | 165/168 |
| 4,392,362 | 7/1983 | Little | 165/168 |
| 4,471,204 | 9/1984 | Takafuji et al. | 219/121 LD |
| 4,489,570 | 12/1984 | Little | 165/168 |
| 4,495,987 | 1/1985 | Finnan | 165/173 |
| 4,528,733 | 7/1985 | Lord | 29/157.4 |
| 4,578,850 | 4/1986 | Kerr et al. | 165/158 |
| 4,611,474 | 9/1986 | Musinski | 165/185 |
| 4,643,244 | 2/1987 | Bosworth | 165/158 |

FOREIGN PATENT DOCUMENTS

| | | |
|---|---|---|
| 965803 | 6/1957 | Fed. Rep. of Germany . |
| 2120544 | 11/1972 | Fed. Rep. of Germany . |
| 2422168 | 11/1975 | Fed. Rep. of Germany . |
| 1130461 | 10/1956 | France . |
| 2264620 | 10/1975 | France . |
| 371608 | 4/1932 | United Kingdom . |
| 1141102 | 1/1969 | United Kingdom . |
| 1491914 | 11/1977 | United Kingdom . |

OTHER PUBLICATIONS

"Heat Exchangers: Design and Theory Sourcebook", by Afgan et al., (1974), Chapter 35, (no month provided).

*Primary Examiner*—Noah P. Kamen
*Attorney, Agent, or Firm*—Brumbaugh, Graves, Donohue & Raymond

[57] ABSTRACT

A new approach to the theory of heat exchanger optimization is presented which shows the advantages of using low Reynolds and Nusselt numbers and low flow velocities along with a novel design, the microtube-strip (MTS) counterflow heat exchanger. The MTS exchanger in the preferred embodiment consists of a number of small modules connected in parallel. Each module typically contains eight rows of one hundred tubes, each of 0.8 mm outside diameter and 0.16 m length. The tubes are metallurgically bonded via the diffusion welding technique to rectangular header tube strips at each end. Caps suitable for manifolding are welded over the ends. Cages are provided to cause the shell-side fluid to flow in counterflow fashion over substantially all of the tube length, and suitable manifolds are provided to connect the modules in parallel. This design results in the highest power densities of any known design for single phase exchangers. Although the MTS exchanger of the present invention is specifically optimized for applications not involving phase changes in the working fluid, the essential concepts and features of this invention can also be advantageously used in applications involving change of phase.

17 Claims, 3 Drawing Sheets

MICROTUBE-STRIP HEAT EXCHANGER

Matter enclosed in heavy brackets [ ] appears in the original patent but forms no part of this reissue specification; matter printed in italics indicates the additions made by reissue.

*This application is a continuation of application Ser. No. 243,048, filed on 9/9/88, now abandoned, which is a reissue of application Ser. No. 700,125, filed on 2/11/85, U.S. Pat. No. 4,676,305.*

BACKGROUND OF THE INVENTION

The field of this invention is heat exchangers, and more particularly, counterflow, modular, shell-and-tube-type exchangers for single phase fluids with no heat transfer augmentation means.

PRIOR ART

The result of four decades of industrial and commercial interest in heat exchangers has seen a proliferation of specialized devices and manufacturing techniques that offer some advantages in special applications. The present invention is based on a radical departure from conventional heat exchanger design guidelines in several distinct areas. As a result, the design differs in a number of ways, but the most significant innovative feature is the most subtle and is not apparent without a detailed theoretical explanation. This most important feature is its size. This change represents such radical departures from conventional practice in typical Nusselt and Reynolds numbers as to make reference to prior art of limited value. Nonetheless, for reference value and completeness, a brief synopsis of the prior art is presented.

Numerous examples of modular, counter-flow shell and tube exchangers can be found in the patent literature, one of the earlier examples being Rossi's bi-directional flow design, U.S. Pat. No. 2,839,276, with its advantages of reduced thermal stresses. A more typical recent design is that of Baumgaertner et al, U.S. Pat. No. 4,221,262, which offers some construction advantages over earlier designs due to the reduced complexity of its basic modules. Quite atypical and impractical, but of revelance on account of its general system appearance, is Giardina's U.S. Pat. No. 4,253,516, with its huge box-car sized modules.

Jabsen et al in U.S. Pat. No. 4,289,196 and Culver in U.S. Pat. No. 4,098,329 employ unique heading and manifolding systems in attempts to achieve higher power densities in modular systems. Cunningham et al give attention to hot corrosive problems in U.S. Pat. No. 2,907,644. Lustenader recognizes the problem of axial conduction losses in U.S. Pat. No. 3,444,924, a problem obviously not understood by most heat exchanger design engineers.

Corbitt et al address the problem of vortex induced resonances in cross flow exchangers, U.S. Pat. No. 2,655,346, and solve it via the strategic positioning of baffles. Scheidl uses a tube support grid to solve these problems in U.S. Pat. No. 3,941,188.

Bays, U.S. Pat. No. 2,537,024, and Malewicz, U.S. Pat. No. 3,452,814, give several examples of heat flow augmentation, which is easily shown to be of negative value in a gas-gas heat exchanger optimized according to the present invention.

Various well-known joining techniques include Cottone and Sapersteine's use of special braze alloys, U.S. Pat. No. 4,274,483, Olsson and Wilson's cold pressure welding, U.S. Pat. No. 4,237,971, Hardwick's explosive welding, U.S. Pat. No. 3,717,925, Brif and Brif's expanded tubes, U.S. Pat. No. 4,239,713, and the related technique of Yoshitomi et al, U.S. Pat. No. 4,142,581. More closely related to the diffusion technique of the present invention is the press-fit method of Nonnenmann et al, U.S. Pat. No. 4,159,741, and the compression method of Takayasu, U.S. Pat. No. 3,922,768. However, these techniques as described fall short of producing a high integrity metallurgical bond. Lord's U.S. Pat. No. 4,528,733 describes a joining technique suitable for applications in which the header is made of a material which undergoes a phase change that is accompanied by an abrupt change in dimension. Mattioli et al, U.S. Pat. No. 3,849,854, describe a method of effecting diffusion welds via induction heating followed by electromagnetic compression that is suitable for large, accessible joints. Woods, U.S. Pat. No. 2,298,996, describes a method of hard brazing aluminum and copper alloy 6 mm tubes, extending beyond their rectangular headers and expanding into a polygonal shape so as to reduce tube side pumping losses in turbulent flow applications, into rectangular headers, while Troy, U.S. Pat. No. 3,782,457, describes the use of 2 mm tubes in an annular header with heat transfer augmentation.

Frei's U.S. Pat. No. 4,295,522, employing glass tubes and silicone casting resins, shows a striking resemblance from a non-scaled perspective between his basic tube assembly modules and the present invention. Furthermore, the tube sizes employed therein also show progressive design traits, being about 6 mm in diameter rather than the customary 1.5 cm to 2.5 cm employed in all other above referenced patents. However, Frei's design, aside from temperature and pressure limitations imposed by the choice of materials, suffers from the inefficiencies inherent in a cross-flow design, as necessitated by his manifolding scheme.

The use of small diameter tubes-O.D. less than about 3 mm-has been predominantly limited to two-phase cross-flow systems. Early examples may be found in aircraft oil-coolers such as that by Anderson, U.S. Pat. No. 2,449,922, and the later art. The only apparent application involving the use of tubes under 1 mm O.D. is that of Christen et al, U.S. Pat. No. 4,098,852, which employs osmotic or ultrafiltering polymeric tubes and vaporizing liquids. Christen's patent also utilizes the shortest tubes found in the prior art in counterflow exchangers, such length being only about 0.6 m, compared to the more typical length of about 5 m. Roma's U.S. Pat. No. 4,030,540 is cited as a typical example of prior art design guidelines that often resulted in such unsound objectives as attempting to maximize tube length, whereas the correct objective is always to minimize tube length while satisfying several additional criteria.

Some useful related theoretical background materials may be found in two of my earlier patents, although these inventions are quite remote from the present invention; U.S. Pat. No. 4,321,962 describes a solar energy heat exchanger and storage system; and U.S. Pat. No. 4,456,882 describes a high-speed turbine-driven air-bearing-supported sample spinner.

SUMMARY OF THE INVENTION

The present invention, the microtube-strip (MTS) counterflow heat exchanger, in the preferred embodiment consists of a number of heat transfer augmentation-free small modules connected in parallel. Each module typically contains eight rows of one hundred tubes, each of 0.8 mm outside diameter and 0.16 m length. The tubes are metallurgically bonded to rectangular header tube strips at each end. Caps suitable for manifolding are welded over the ends. Means are provided to cause the shell-side fluid to flow in counterflow fashion over substantially all of the tube length, and suitable manifolds are provided to connect the modules in parallel. Power capacity per unit volume per unit temperature difference of the MTS exchanger exceeds that of prior art typical designs by a factor of ten to 1000. Power capacity per unit cost per unit temperature difference of the MTS exchanger may exceed that of prior art designs by a factor as large as 10 in some cases. Flow conditions in the microtubes are fully laminar and extremely subsonic.

Various other objects, features, and attendant advantages of the present invention will be more fully appreciated as the same becomes better understood from the following detailed description, when considered in connection with the accompanying drawings, wherein:

DETAILED DESCRIPTION OF THE PREFERRED EMBODIMENT

The Heat Exchange Power

Figure 1:
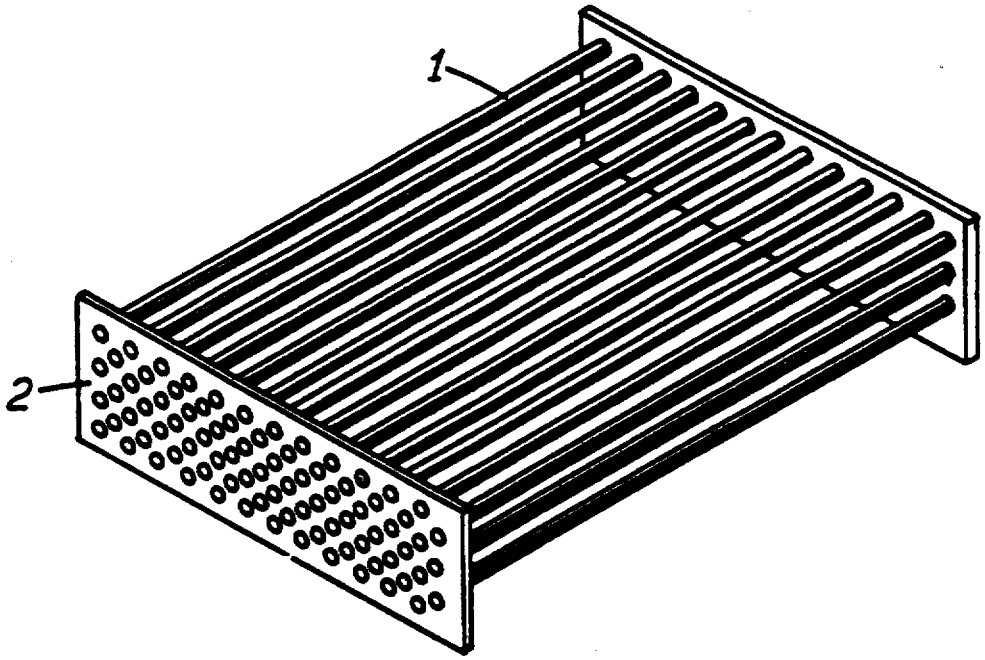
FIG. 1 is an isometric drawing of an MTS sub-assembly.

The usual approach to heat transfer problems is to begin with the following equation:

$$P_h = h\,A\,T_\delta \tag{1}$$

where $P_h$ is the heat transfer power (W), h is the heat transfer coefficient ($W/m^2K$), A is the surface area ($m^2$), and $T_\delta$ is the temperature difference (K). The problem then is to determine suitable expression for h under various conditions. Unfortunately, most engineers, after looking at equation (1), thereafter tacitly assume that the heat exchange power is proportional to the total surface area. It is this erroneous underlying assumption that has virtually stagnated progress in signal phase heat exchanger design for four decades. The often overlooked fact is that the complicated heat transfer coefficient, h, is always inversely dependent on a characteristic dimension of the heat exchanger, often in such a way that $P_h$ increases only as the square root of the area. In some case, $P_h$ may be independent of certain changes in the area, and in other cases $P_h$ may actually be decreased by an increase in the area.

Consider first, for example, the tube-bundle heat exchanger with high turbulent gas flowing through the tubes, which are bathed in a constant temperature fluid. The conventional approach is to write the heat transfer coefficient in terms of the dimensionless Nusselt number, Nu.

$$Nu = hd/k, \tag{2}$$

where d is the inside diameter (m) of the tubes and k is the thermal conductivity ($Wm^{-1}K^{-1}$) of the gas. The Nusselt number is then expressed in terms of two additional dimensionless groups, the Prandtl number, Pr, and the Reynolds number, Re.

$$Pr = C_p\mu/k, \tag{3}$$

where $C_p$ is the constant pressure specific heat (J/kgK), and $\mu$ is the dynamic viscosity ($kgm^{-1}s^{-1}$).

$$Re = \rho vd/\mu = 4G/\pi\mu d \tag{4}$$

where $\rho$ is the density of the gas ($kg/m^3$), v is the mean velocity of the gas (m/s), and G is the mass flow rate per tube (kg/s). Then, for highly turbulent flow it can be demonstrated that, $$Nu = 0.023Pr^{.4}Re^{.8} \tag{5}$$

Combining equations (2) through (5) gives the following expression for the heat transfer coefficient.

$$h = 0.023(k/d)Pr^{.4}(4G/\pi\mu d)^{.8} \tag{6}$$

Thus, for a given turbulent mass flow rate through a bundle of tubes of length L, the heat exchange power of equation (1) is proportional to the length, and inversely proportional to the 0.8 power of the diameter. Hence, increasing the area by increasing the tube diameter actually decreases the heat exchange power, and the advantages of short tubes of small diameter are readily apparent.

Now consider the case of a tube-type counterflow laminar-flow heat exchanger with center-to-center tube spacing equal to 1.4 times the outside diameter of the tubes and twice the inside diameter. Further assume that the thermal conductivity of the tube material is much greater than the thermal conductivity of the fluids. For this case, it can be shown that the heat exchange power is independent of the tube diameter, and is given by the following expression:

$$P_h = 4\pi nL\left(\frac{k_1k_2}{.7k_1 + k_2}\right)T_\delta \tag{7}$$

where n is the number of tubes, $k_1$ is the thermal conductivity of the inner fluid, and $k_2$ is the thermal conductivity of the outer fluid.

From the above discussion it appears that there is little utility in evaluating a heat exchanger in terms of a heat exchange coefficient of dimensions $Wm^{-2}K^{-1}$ as is customary in the professional and patent literature. Rather, a more useful characterization is the total effective flow length, nL. By defining nL as the quotient of $P_h$ and a generalized function of $k_1$ and $k_2$, one arrives at a useful method of comparing diverse designs-including those which incorporate heat transfer augmentation means such as extended or roughened surfaces.

Power Losses

The power, $P_{p1}$ required to pump a fluid through the heat exchanger tubes is given by:

$$P_{p1}=(\Delta p)A_f v, \quad (8)$$

where $\Delta p$ is the pressure drop (Pa) through the exchanger, $A_f$ is the frontal fluid area ($m^2$), and v is the mean fluid velocity (m/s).

For simplicity, consider the case of laminar fluid flow through long, smooth tubes. This condition exists for Reynolds numbers, Re, below 2000. The pressure drop, $\Delta p$, in a fluid flowing through a tube under laminar conditions is given by:

$$\Delta p=32\mu Lv/d^2, \quad (9)$$

thus:

$$P_{p1}=8\pi\mu nLv^2. \quad (10)$$

The shell-side pumping power loss, $P_{p2}$, required to pump fluid around the tubes can be expressed by a similar equation:

$$P_{p2}=f\mu nLv^2, \quad (11)$$

where the gas parameters $\mu$ and v now refer to the external gas, and the coefficient f is a complicated function of tube diameter and spacing. For the standard hexagonal-close-pack pattern with the distance between tube centers equal to 1.4 times the tube outside diameter, f is approximately equal to 200.

In addition to the pumping power loss, there is another internal loss mechanism present in counterflow exchangers which may limit the thermodynamic efficiency: the axial thermal conduction power of the tube metal, $P_m$.

$$P_m=\pi dnwk_m(T_H-T_C)/L, \quad (12)$$

where w is the wall thickness of the tubes (m), $k_m$ is the thermal conductivity of the tube metal ($Wm^{-1}K^{-1}$), $T_H$ is the mean temperature at the hot end, and $T_C$ is the mean temperature at the cold end.

Optimization

The power available, $P_i$, from the input gas is:

$$P_i=GC_p(T_H-T_C), \quad (13)$$

where $C_p$ is the constant pressure specific heat (J/kgK), and G is the mass flow rate (kg/S) and is equal to $\rho A_f v$. The waste heat, $P_o$ is $$P_o=GC_pT_\delta, \quad (14)$$

where $T_\delta$ is, as defined earlier, the mean temperature difference between the counterflowing gases.

Accounting for the losses, the available heat exchange power, $P_E$, is $$P_E = 4\pi nLT_\delta\left(\frac{k_1k_2}{.7k_1 + k_2}\right) + P_{p1} - P_m/2. \quad (15)$$

Equating input and output power gives, under steady-state conditions, the following:

$$P_i+2P_{p1}=P_E+P_o. \quad (16)$$

The above equations can now be solved for $T_{67}$ using the definition of mass flow rate and assuming w=d/3.

$$T_\delta = \frac{(T_H - T_C)(GC_p + nd^2k_m/2L) + 128L\mu G^2/n\pi\rho^2d^4}{4\pi nL\left(\frac{k_1k_2}{.7k_1 + k_2}\right) + GC_p} \quad (17)$$

This equation depends only on three geometric variables, n, L, and d, and is reasonably valid for tube-type counterflow laminator heat exchangers, subject to several above mentioned assumptions. One can now calculate the power losses and the available heat exchange power for a given set of thermodynamic and geometric conditions. The design can be optimized via the linear programming technique of maximizing an objective function, $F_c$, such as the following:

$$F_c=(P_E-aP_p-bP_o)/(\text{total cost}), \quad (18)$$

where a and b may have values of 10 and 2 respectively. It becomes apparent after exercising a linear programming technique on equation (18) that by giving proper attention to minimizing costs associated with tube cutting and end preparation, header hole punching, and tube assembly and insertion techniques, optimized high power single phase heat exchangers take on a totally new appearance. They consist of hundreds or perhaps thousands of small modules, each of which consists of hundreds of small, short tubes. Reynolds numbers inside the microtubes for these optimized designs range from 25 to 400, compared to the more common prior art values of 10,000 to 100,000; and Nusselt numbers are less than 5, compared to the typical prior art values of 20 to 400. The result is fully developed laminar flow, tube side and shell side, and flow velocities below one tenth the speed of sound.

Alternatively one may choose as objective function $F_v$ such that $$F_v=(P_E-aP_p-bP_o)/(\text{total volume}), \quad (19)$$

Astoundingly, this function is unbounded. In other words, it is theoretically possible to increase the power-to-volume ratio without limit, without increasing pumping losses, if one can reduce the tube diameter and length and increase the number of tubes without limit. Of course, the above equations cease to be valid under molecular flow conditions.

The Tubing

Current practice in tube-type counterflow exchangers generally uses induction-welded steel, copper, or aluminum tubes of about 3 mm to 25 mm diameter with lengths ranging from 0.5 to 6 m and wall thickness of about 0.25 mm to 3 mm. However, recent advances in high speed laser welding and super-hard die technology now make it possible to produce very small stainless steel hypodermic tubing at very low production costs-less than $0.10 per meter. It is thus practical to consider the use of tubing with an outside diameter of less than 1 mm.

Reducing the tubing diameter by a factor of 10 requires the length to be reduced by a factor ranging from 30 to 100 while the number of tubes is increased by a similar factor in order to maintain the same heat exchange power and pumping power loss. However, the total volume of the heat exchanger is likewise reduced. Furthermore, the maximum internal pressure rating of the heat exchanger will probably be increased due to an increase in the relative wall thickness.

To facilitate rapid assembly of large numbers of small tubes, it is necessary to depart from the disc shaped tube header sheet normally used in heat exchangers and instead use a rectangular tube header sheet or strip. Furthermore, to minimize tube flexing and to reduce support requirements, it is also desirable to keep the tube length relatively short. This will also insure that the buckling strength of the tubes is large enough to permit pressing them into the tube strip. Moreover, it will raise the transverse acoustic resonance modes of the tubes thereby making it more difficult to excite such resonances by turbulence. Also, equations 10 and 11 show that reducing the tube length will reduce the pumping power losses.

The maximum practical tube length for high-modulus, high strength alloys such as strain-hardened stainless steel or precipitation-hardened superalloys is about 300 times the outside diameter of the tubes, while the maximum practical length for copper or aluminum tubes is about half that amount. There are several additional reasons for preferring stainless steel or superalloys over the more common heat exchanger metals: (1) They have very low thermal conductivity which may make them easier to laser weld, but most importantly reduces the internal axial conduction loss mechanism, $P_m$, in the counterflow exchangers; (2) Their high tensile strength allows higher working pressures; and (3) Their corrosion and high temperature strength properties are essential in many applications.

Welding and Manifolding

The key to the current invention is the recognition of the advantage of using small diameter tubing in very short lengths. Its implementation depends on technological breakthroughs in the assembly, welding, and manifolding of these tubes. Since the tubes are very short, it is necessary to resort to narrow modules in order that counterflow conditions be established over the major portion of the tube length and also to reduce the inefficiencies due to non-uniform flow. While a cross-flow arrangement could be used to circumvent the above mentioned non-uniform flow problems, such as arrangement would greatly reduce the thermodynamic efficiency. The counterflow-serial-crossflow arrangement commonly used in large installations allows somewhat higher efficiency than the crossflow arrangement but at increased pumping losses. Hence, the most satisfactory solution is that of narrow modules of four to twenty rows of tubes.

The extremely small size of the tubes makes almost all types of conventional welding methods impractical, and the extremely large number of tubes eliminates most types of individual tube welding techniques, probably including automated electron beam and laser techniques because of process control problems arising from thermal expansion during the welding operations. Two viable options for the tube-to-strip welds are fluxless brazing and diffusion welding. A wide variety of conventional welding techniques are suitable for the rest of the welds.

In the fluxless brazing technique, the braze metal is plated onto the inside of the holes and onto the outside of the tubes prior to assembly. After assembly, the complete module is heated in vacuum or inert atmosphere to the liquidus temperature of the braze metal. This method is not suited for very high temperature exchangers.

Diffusion welding can be accomplished if the tube diameter and hole size can be held to very tight tolerances. The use of hardened tubes and annealed tube strips then makes it possible to press the tubes into slightly undersized holes. With proper attention to surface quality and a minimum of 0.3% interference press fit, a strong metallurgical bond can be formed simply by heating the assembly to about 0.8 times the absolute melting temperature (K). This method is suitable for the highest temperatures and all alloys.

Corrosion

In many cases, heat exchangers must operate in severely corrosive environments. Under these conditions, it is no longer theoretically possible to increase the power-to-volume ratio without limit. The current state-of-the-art in corrosion resistant alloys, such as Nimonic 81, limits the minimum wall thickness of about 50 microns for moderately corrosive environments and about 200 microns for severely corrosive environments. Although the tubes themselves are too small to make coatings or laminations practical with current technology, such measures may be applied to the tube strips and to the manifolds for economy of materials or to achieve combined high temperature strength and hot corrosion resistance.

Thermal Response Time

In many applications, particularly in the case of mobile gas turbines, fast response times are necessary for efficient operation. Currently, a typical 2000 KW gas turbine may have a mechanical response time of one minute, but the thermal response time of the heat exchangers incorporated into the system may be ten hours. Increasing the power-to-mass ratio of the heat exchanger by the amount possible with the MTS design could reduce the thermal time constant to less than one minute. Such a dramatic reduction in mass and thermal time constant opens up many new applications in all areas of transportation-especially aerospace.

High Pressure Applications

In many applications, for example, in recuperators used in closed cycle gas turbines, it is necessary to maintain both the internal (tube-side) and the external (shell-side) fluids at high pressure. The narrow width of the tube header strip makes this design well suited to high tube-side pressures. When high shell-side pressures are required, the entire heat exchanger must be enclosed in a pressurized containment vessel. The small size of the heat exchanger simplifies this task.

DETAILED DESCRIPTION OF THE DRAWINGS

The basic unit in the MTS heat exchanger is the MTS sub-assembly as illustrated in FIG. 1. It consists of typically eight rows of heat transfer augmentation free microtubes 1 with typically 40 to 200 microtubes in each row. The microtubes are diffusion welded into precision MTS header strips 2 at each end. The diffusion welding is accomplished by using ultra precision, diamond-die-reduced, laser welded hard drawn tubing for the microtubes, and precisely machining the holes in the annealed header strip to a size at least 0.3% smaller but not more than 5% smaller than the tubing outside diameter. A combination of techniques may be required to produce the precision holes in the header strips, including feinblanking, electrochemical machining, and reaming. The diffusion welds are accomplished by (1) insuring that the tubes and holes have thoroughly cleaned, oxide-free surface prior to assembly, (2) maintaining a minimum of 0.3% interference press fit, (3) heating the sub-assembly in an inert atmosphere or vacuum to a temperature of approximately 80% of the absolute melting temperature of the tube or header strip alloy, whichever is lower.

Figure 2:
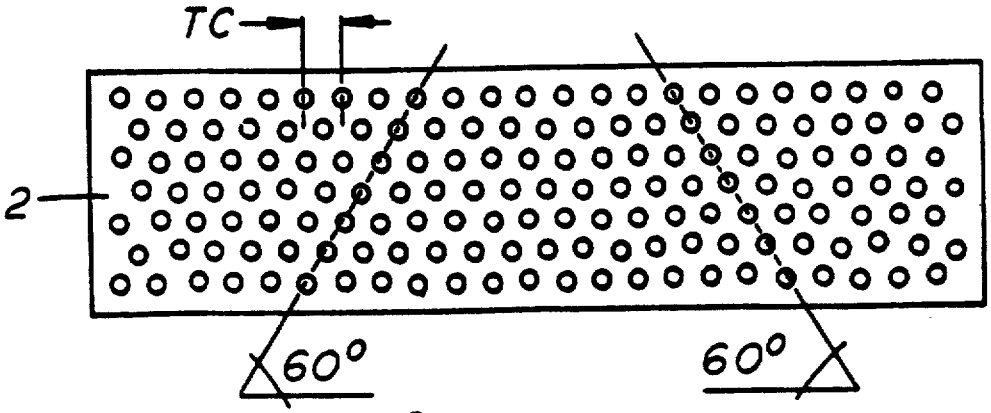
FIG. 2 is a plane section view of an MTS header.

FIG. 2 illustrates the recommended HCP (hexagonal close pack) hole pattern for the MTS header strip 2. The distance between rows is equal to 0.866 times the distance between tube centers, TC, which is generally about 1.3 to 2.8 times the O.D. of the sample tubes 1.

Figure 3:
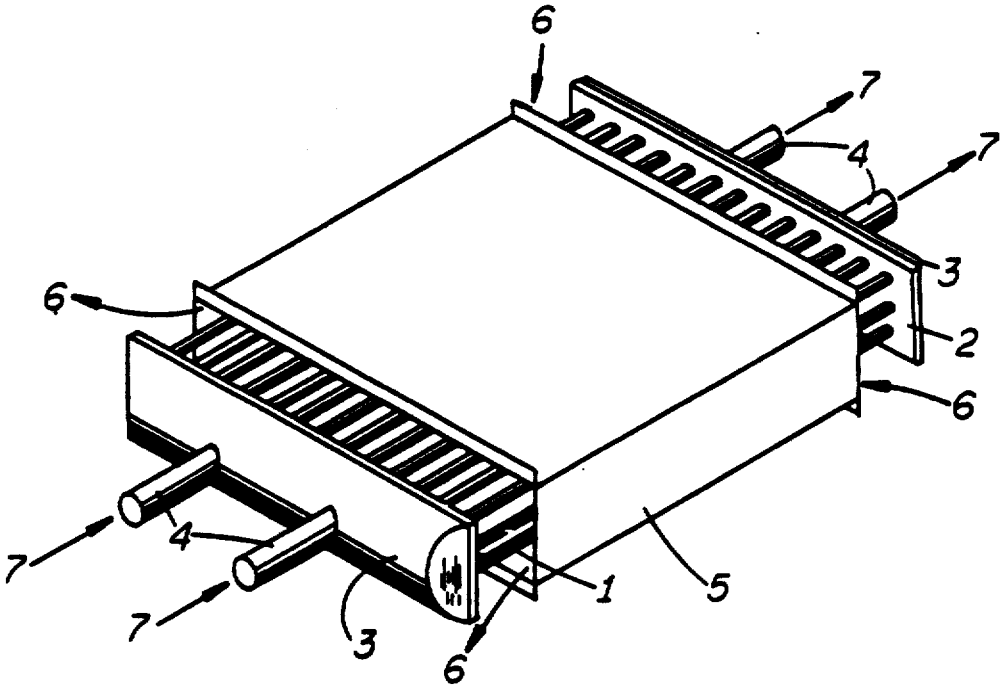
FIG. 3 is an isometric drawing of an MTS module.

FIG. 3 illustrates the basic counterflow MTS module. It includes a semi-cylindrical cap 3 welded to each header strip. Care is taken to assure that the header strip 2 is no wider than is necessary to accommodate the microtubes 1 and the relatively thin walled cap 3 so that the MTS modules may be mounted closely in parallel. Tube-side manifold ports 4 are provided on each cap 3. A cage 5 closely surrounds the MTS sub-assembly, except near each header strip, forcing shell-side fluid 6 to enter around the periphery of the MTS sub-assembly near one end and to exit in like fashion at the other end. Tube-side fluid 7 enters the tube-side manifold ports 4 at the end at which the shell-side fluid exits, and it exits in like manner at the opposite end.

Figure 4:
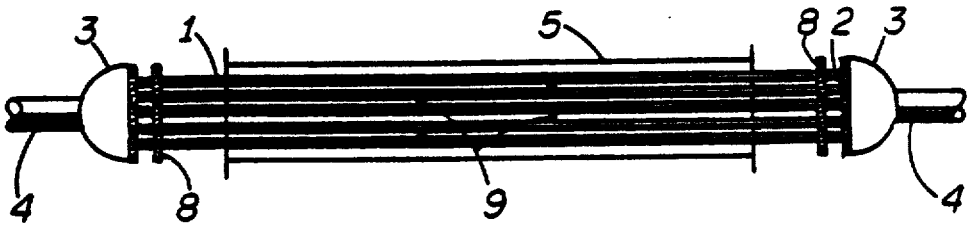
FIG. 4 illustrates two reinforcement techniques for MTS modules operating with high tube-side pressure.

In certain applications, extremely high tube-side pressures, perhaps combined with very high temperatures, may require additional support of the flat header strip 2, to prevent bowing of this surface. This additional support may be provided as shown in FIG. 4 by diffusion welding a reinforcement plate 8 similar to the header strip 2 a short distance from it. Alternatively, the required support may be provided by the microtubes 1 if they are supported in such a way to prevent their buckling. This may be accomplished by bonding, preferably by projection welding, stiffening wires 9 crosswise between the rows of microtubes 1. By staggering or offsetting the location of adjacent stiffening wires 9, the effect on fluid flow is generally made negligible.

Figure 5:
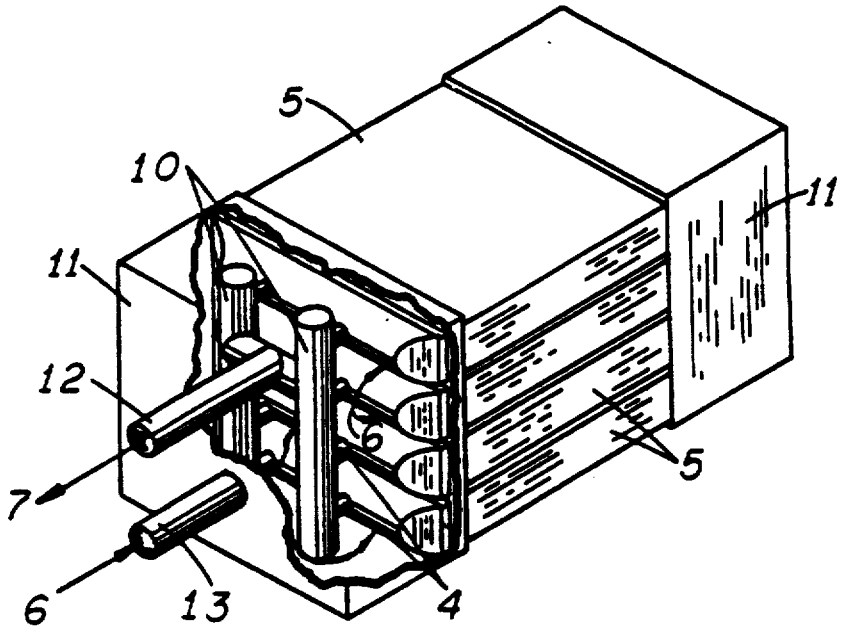
FIG. 5 is an isometric drawing of a plurality of MTS modules manifolded together in parallel to form an MTS block.

FIG. 5 illustrates the parallel manifolding of several MTS modules to form an MTS block. Individual fluid ports 4 are connected to a tube-side manifold 10 at each end. The manifold cages 11 in cooperation with the MTS module cages 5 form the shell-side sealed region. Tube-size fluid may exit at tube-side manifold port 12 while shell-side fluid may enter at manifold cage port 13. The MTS modules are supported by the headers, with adequate clearance space between the adjacent caps to permit the required shell-side flow 6 between caps with acceptable pressure drop. Typical MTS blocks may include four to fifteen MTS modules in parallel, and typical high power installations may include hundreds of such MTS blocks further manifolding in parallel.

Figure 6:
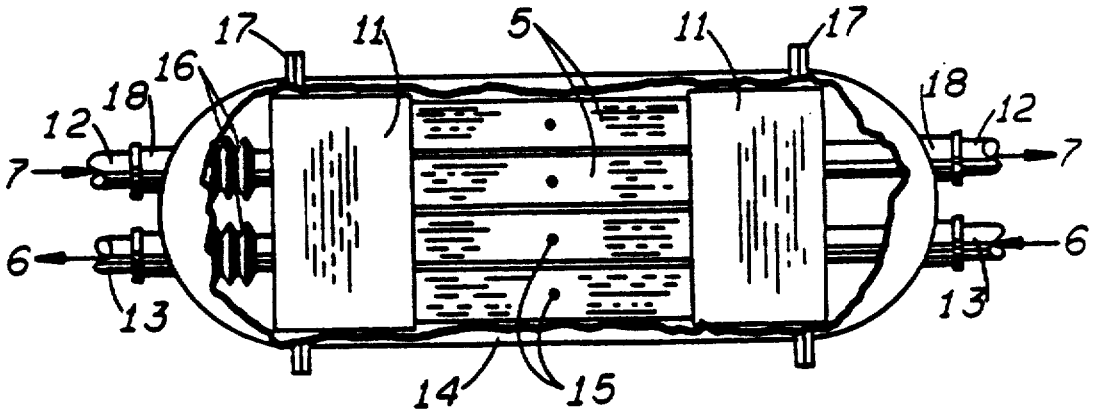
FIG. 6 illustrates an MTS block enclosed in a pressurized vessel.

FIG. 6 depicts an MTS block mounted inside a pressure vessel 14 forming an MTS tank for applications requiring high shell-side pressures. Pressure equalizing vents 15 are required to equalize mean static pressure components on the flat surface of the MTS cages 5 and manifold cages 11. The dynamic pressure components arising from the shell-side fluid pressure drop through the MTS block must be kept relatively small to prevent excessive deflection of the flat surfaces. Expansion joints 16 are required at one end to relieve axial thermal stresses. Suitably sealing flanges 17 and 18 are provided to permit convenient assembly of the containment vessel 14 and adequate sealing around the ports 12 and 13. Suitable radial support for the MTS block within the vessel is required at the end which includes the expansion joints 16.

Although this invention has been described herein with reference to specific embodiments, it will be recognized that changes and modifications may be made without departing from the spirit of the present invention. All such modifications and changes are intended to be included within the scope of the following claims.

What is claimed is:

1. A gas-gas laminar-flow heat exchanger module which comprises:

a plurality of heat transfer augmentation-free corrosion resistant, precision, hardened, metallic tubes [arrayed in at least four parallel disposed planar rows of at least forty tubes per row] *arrayed in a plurality of rows of tubes*;

a first rectangular header strip interference press fit and diffusion welded to one end of each of said tubes;

a second rectangular header strip interference press fit and diffusion welded to the other end of each of said tubes;

first manifold means metallurgically connected to said first rectangular header strip for defining a gas inlet flow path into said one end of each of said tubes;

second manifold means metallurgically connected to said second rectangular header strip for defining a gas outlet flow path from said other end of each of said tubes;

means disposed externally of said tubes for defining a counterflow flow-path of heat exchanger gas over substantially the entire length of the external surfaces of each of said tubes from within the vicinity of said other end of each of said tubes to within the vicinity of said one end of each of said tubes;

each of said tubes having an outside diameter of less than 3 mm;

each of said tubes having a length which is sufficient to allow for fully developed laminar flow and which is less than 300 times and outside diameter of each of said tubes; and said plurality of tubes within each of said rows being laterally spaced by a center-to-center distance of from 1.3 to 2.8 times the outside diameter of each of said tubes.

2. A module according to claim 1 wherein said tubes have been produced from high tensile strength alloy metal.

3. A module according to claim 2 wherein said high strength metal alloy is stainless steel.

4. A module according to claim 1 wherein said rectangular header strips are reinforced against high gas pressure by reinforced plates.

5. A module according to claim 1 wherein said tubes are supported at one or more locations by stiffening wires welded between said rows.

6. A module according to claim 1 wherein said outside diameter of each of said tubes is approximately 0.8 mm.

7. A module according to claim 6 wherein said length of each of said tubes is approximately 0.16 m.

8. A module according to claim 1 wherein said array of tubes comprises [eight] *at least 4 parallel disposed planar* rows of said tubes [with from 40 to 200] *with at least 40* tubes per row.

9. A module according to claim 1 wherein said tubes are disposed within said rectangular header strips through means of a 0.3% to 5% interference press fit.

10. A module according to claim [1] *8* wherein the distance between said parallel rows is equal to 0.866 times said center-to-center tube distance.

11. A module according to claim 1 wherein said means external of said tubes for defining said counter-flow flow-path of said heat exchanger gas comprises a cage annularly surrounding said array of tubes.

12. A module according to claim 1 further comprising a plurality of said modules defined by said tubes, said first and second header strips, and said first and second manifold means, vertically stacked together; and third and fourth manifold means, respectively connecting together said sets of first second manifold means of each of said modules, for supplying said tube-side gas inlet and outlet paths from said modules; whereby said modules and said third and fourth manifold means define a heat exchanger module block.

13. A module according to claim 12 further comprising pressure vessel means for housing said block and thereby defining a heat exchanger module tank.

14. A module according to claim 13 further comprising cage means surrounding and enclosing said first and second manifold sets and said third and fourth manifold means for defining a counter-flow flow-path of heat exchanger gas externally of said plurality of tubes.

15. A module according to claim 14 wherein said cage means are disposed internally within said pressure vessel means.

16. A module according to claim 15 further comprising expansion joint means defined between at least one of said cage means and said pressure vessel means for relieving axial thermal stresses.

*17. A module according to claim 8 wherein said array of tubes comprises eight rows of said tubes with from 40 to 200 tubes per row.*

* * * * *

UNITED STATES PATENT AND TRADEMARK OFFICE

CERTIFICATE OF CORRECTION

PATENT NO. : RE. 33,528

DATED : January 29, 1991

INVENTOR(S) : David F. Doty

It is certified that error appears in the above-identified patent and that said Letters Patent is hereby corrected as shown below:

Title page, item (56) 1st col., 7th-from-bottom line, "1/9170" should read --1/1970--;.

Column 3, line 64, "case" should read --cases--;.

Column 6, line 4, "$T_{67}$" should read --$T\delta$--.

Column 7, line 51, "as" should read --an--.

Column 9, line 10, "surface" should read --surfaces--; and.

Column 12, line 1, "first" should read --first and--.

Signed and Sealed this

First Day of September, 1992

*Attest:*

DOUGLAS B. COMER

*Attesting Officer*

*Acting Commissioner of Patents and Trademarks*